G. BASLER.
APPARATUS FOR TEMPERING AND FLEXING SOLES AND THE LIKE.
APPLICATION FILED MAR. 15, 1912.
1,036,061.
Patented Aug. 20, 1912.
2 SHEETS—SHEET 1.
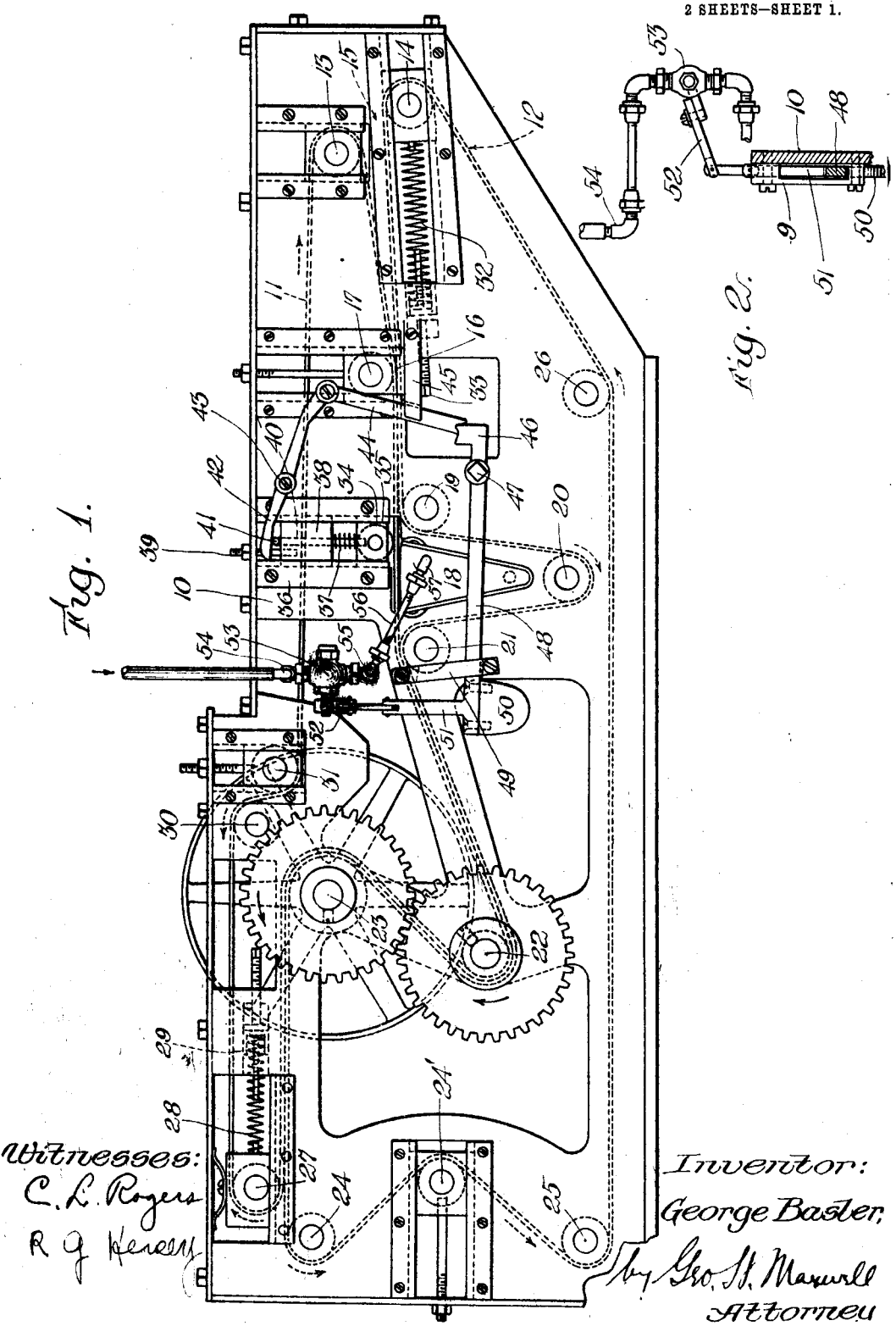
Witnesses:
C. L. Rogers
R. G. Henery
Inventor:
George Basler,
By Geo. H. Maxwell
Attorney G. BASLER.
APPARATUS FOR TEMPERING AND FLEXING SOLES AND THE LIKE.
APPLICATION FILED MAR. 15, 1912.
1,036,061.
Patented Aug. 20, 1912.
2 SHEETS—SHEET 2.
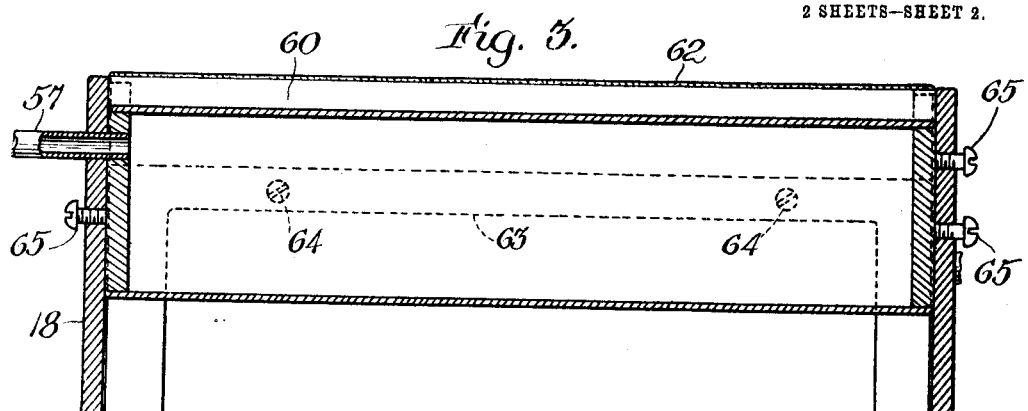
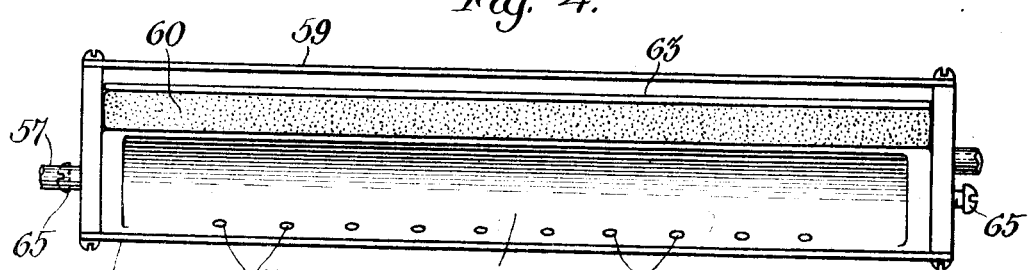
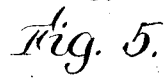 
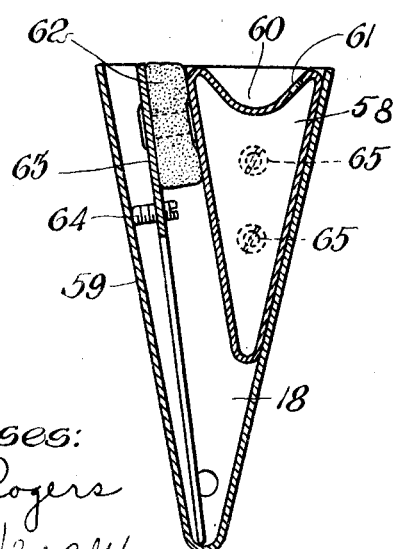 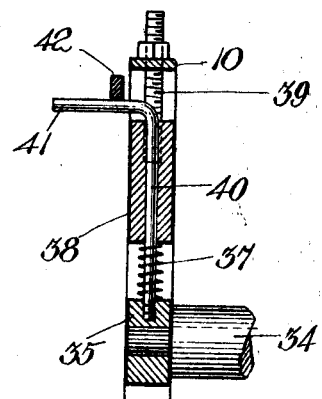
Witnesses:
C. L. Rogers
Inventor:
George Basler,
by Geo. H. Maxwell,
Attorney.

UNITED STATES PATENT OFFICE.

GEORGE BASLER, OF LYNN, MASSACHUSETTS, ASSIGNOR TO BASLER MACHINERY COMPANY, OF LYNN, MASSACHUSETTS, A CORPORATION OF MAINE.

APPARATUS FOR TEMPERING AND FLEXING SOLES AND THE LIKE.

1,036,061.

Specification of Letters Patent.

Patented Aug. 20, 1912.

Application filed March 15, 1912. Serial No. 684,069.

*To all whom it may concern:*

Be it known that I, GEORGE BASLER, a citizen of the United States, and resident of Lynn, county of Essex, State of Massachusetts, have invented an Improvement in Apparatus for Tempering and Flexing Soles and the Like, of which the following description, in connection with the accompanying drawings, is a specification, like letters on the drawings representing like parts.

In the present day manufacture of shoes, one of the prime requirements is that the shoe, particularly the sole, be extremely flexible and adapted to yield and conform to the movement of the foot in walking, and my present invention has for its object to provide improved apparatus for tempering and then opening and stretching the stock of the sole to make it pliable by flexing or working the sole, so that it becomes permanently flexible and pliable. In my prior application, Ser. No. 659,730 filed November 11, 1911, I have shown and claimed an apparatus for this purpose wherein the soles or other stock to be rendered flexible are first treated with tempering fluid applied in a manner to thoroughly and evenly impregnate the soles, and then held strongly and evenly gripped between belts moving in unison which stretch and open the pores of the moistened stock by flexing the soles around arcs of small radii to render them pliable. In said prior application I have claimed my improvements in the apparatus for stretching the stock and opening the pores thereof by flexing and working them in the manner described so that a relative play or give of the fibrous texture is brought about. In the present application, I have shown the same basic combination and relative arrangement of the flexing means and the fluid applying or impregnating means, and I am herein claiming the combination of the fluid impregnating and flexing mechanism broadly and specifically, *i. e.*, the present case contains broad combination claims which could have been made in said earlier application, but are not made therein because it is desired to protect in that case the flexing or pore-opening mechanism *per se* without reference to the fluid impregnating means which coöperates therewith to effect the tempering of the stock and rendering of the same permanently pliable and flexible along with the incidental, but important beneficial effects of a cleansing, bleaching and preserving of the grain side of the stock. The present case is limited to broad claims for the combination with such flexing and pore-opening means of fluid impregnating means arranged for coöperation in the manner set forth to work up and render permanently pliable the stock after being treated to the tempering liquid, the fluid impregnating means being also viewed and claimed broadly to cover both species thereof (of the two applications) and also specifically to cover the particular species herein contained. By the term "flexing" as used in the present description and claims, I mean such a bending of the leather stock relative to the thickness thereof that the fibers of one side thereof are stretched, worked and opened in a manner to permit striking in of the tempering fluid to the best advantage, the stock being preferably thereafter similarly bent in a reversed direction to further work up the previously open fiber at the side of the stock thus stretched by closing and compressing the same together, the other side of the stock being coincidently stretched and the fibers thereof loosened. The term "flexing" thus used therefore contemplates a bending of the stock about a curve of small radius relative to the thickness of the stock, such bend being a sharp or abrupt one and preferably taking place at a short interval after the treatment of the stock to the tempering fluid. My improved apparatus provides for the application of the impregnating fluid at one side only of the stock as it is fed through the machine in determinate and limited quantity, the application being in practice to the grainside of the leather and the principal and most important flexing action being one to stretch and loosen the fiber at this side of the stock. The tempering fluid is applied in such a manner that just enough is taken up by the leather to strike through the grain thoroughly without soaking the whole thickness of the leather.

It is essential for the most successful results that the stock as it is flexed after the application of the tempering fluid, be held strongly and evenly gripped and pressed over the whole surface thereof, this being important to prevent "puffing up" or wrinkling of the skin or surface layer of the leather, and also to insure by such even pressure upon the surface, even distribution of the tempering fluid over all parts of the surface of the stock so that spotting thereof due to uneven distribution of the tempering fluid is prevented. The operation of tempering leather which has heretofore taken a relatively long time by dipping the leather in a tempering fluid and then laying it aside to work in and soften the stock of itself, is thus effected at once by the coöperative action of the flexing means with the fluid applying means and not only is the tempering operation finished very quickly, but the mechanical flexing and working up of the stock imparts thereto a very much greater degree of permanent flexibility and pliable quality than it would have by the usual method of tempering only.

The present invention is in the nature of an improvement upon the apparatus shown in said application, and among its prime objects are to provide improved means for automatically controlling the supply of tempering fluid to the stock just before being flexed, and improved devices for effectively applying the tempering fluid, preferably under pressure, so that a full supply thereof is always maintained, and thus an adequate impregnation of the soles therewith is insured, and at the same time, waste of the fluid is avoided. My said prior application shows one form of means for applying tempering fluid from a pressure supply arranged so that a full supply of tempering fluid is assured continuously, while the soles are fed past the tempering station, and in the present case wherein an improved form of means for applying tempering fluid is shown, I am claiming this part of the mechanism both broadly and specifically.

More particularly, the invention has to do with an improved construction of holder for the tempering fluid and with valve devices, automatically controlled by the passage of the soles to operative position for turning on the supply of tempering fluid during the required period for treating each sole with a full supply of the fluid as it passes the tempering station, and no longer.

The invention will be better understood from the following detailed description, taken in connection with the accompanying drawings, and will be thereafter pointed out in the appended claims.

Referring to the drawings, Figure 1 is a side elevation of a machine wherein my improvements are embodied; Fig. 2 is an elevation, partly in section, showing a portion of the valve controlling mechanism; Fig. 3 is a longitudinal vertical section through my improved tank for supplying the tempering fluid; Fig. 4 is a plan view thereof; Fig. 5 is a transverse section through said tank; and Fig. 6 is a fragmentary sectional view, showing a part of the connection for automatically controlling the supply of tempering fluid.

The general construction of the machine is similar to that of my aforesaid application, and comprises a frame 10 having journaled therein a series of rollers, around which are passed two taut belts 11, 12 for feeding the soles to the tempering station, and thereafter holding the soles gripped between them as they are bent around the flexing rolls. These belts at the forward end of the machine are passed around rollers 13, 14 respectively, spaced apart to provide a receiving mouth 15 to receive the soles, this mouth converging to a point 16, where the two belts are pressed together for feeding the soles forward by pressure exerted on the upper one by the roll 17. Thence the soles are fed to the tempering station 18 between the two belts, and just before reaching said station, the lower belt is looped over rollers 19, 20, 21 around the receptacle for the tempering fluid, the top of this receptacle being in position so that the soles, as fed thereto by the two belts, are moved thereover in contact with the receptacle top by the pressure and tractive impulse of the upper belt. The roller 21 is in such position beyond the upper portion of the tempering fluid receptacle that the two belts are brought together thereover and again catch the soles after they have passed over the receptacle and carry them around a lower flexing roller 22 to bend them in one direction and thence over an upper flexing roller 23 in the opposite direction, so as to bend them reversely. Thence the lower belt 12 passes around roller 24, take-up roll 24', rollers 25 and 26 back to the feeding mouth 15, and the upper belt passes around a tension roller 27 in position to keep the upper belt pressed against the soles and the lower belt, this roller being pressed outward by a spring 28, the tension of which is determined by an adjusting backing 29, so that the belt is kept under proper tension. Thence the upper belt passes around roller 30, and take-up roller 31, back over the roller 13 to the feeding mouth. The roller 14 of the lower belt is shown as a tension roller for tensioning the lower belt in like manner as the roller 27 does the upper belt, it being for this purpose pressed outward by a spring 32 having an adjustable backing 33. By these tensioning devices the belts are kept strongly taut and thus they press strongly and evenly upon all parts of the leather stock surface as is is bent around the flexing rolls. Thus the soles, while held tightly and uniformly gripped between the belts and just after they are treated to the tempering fluid at the station 18, are tensioned and stretched in a manner to open the pores thereof and effect a permanent relative give to the fibrous texture of the material by bending around the lower flexing roller 22 which especially opens the pores at the side of the stock to which the tempering fluid was just previously applied, and then around the upper flexing roller 23 which further works and loosens up the fiber of the stock by bending it in the opposite direction. The soles are thus stretched and rendered permanently pliable to a very marked degree by the combined and coöperative tempering and stretching or pore opening treatment, so that a very much improved product results and soles of ordinary or common grades of leather attain a permanent flexibility and pliability equal to or greater than that of much higher priced stock without any offsetting deterioration or injury of any kind.

My invention provides means whereby the supply of tempering fluid is admitted to the receptacle of the tempering station 18 only while a sole is passing thereover, and for this purpose a roller 34 is journaled in slide blocks 35, guided in vertical bearings 36 of the frame, and normally pressed downward by a coil spring 37 interposed between it and backing blocks 38, held in adjusted position by screw bolts 39, threaded through the frame and engaged therewith. The sliding journal blocks 35 have fixed thereto rods 40, vertically slidable through the backing blocks 38 and with horizontal extensions 41 at their upper ends engaged from above by an extremity of lever 42, fulcrumed at 43 on the frame, and having its other end in pivotal connection with a link 44, which extends down through guides 45 for engagement with the short end 46 of a lever fulcrumed at 47, the longer arm 48 of which moves in guides 49 and is counterweighted, as at 50. The lever end 48 has link connection 51 with a lever arm 52, which is connected to operate a controlling valve 53 in a pipe connection 54 for supplying tempering fluid under pressure to the tempering station from any suitable source of gravity or otherwise. A pipe connection 55 extends from the valve to the tempering station 18 and has a detachable connection 57 with an auxiliary tank 58 adapted to hold the tempering fluid. This auxiliary tank is of generally triangular cross section with an acute angle at its bottom conforming to the cross section of the exterior tank 59 and fitting against one side of the upper portion thereof as best seen in Fig. 5. The auxiliary tank 58 has a concave top 60 forming a trough into which the tempering fluid empties from the inside of the auxiliary tank through a passage 61, so that when the valve 53 is opened the tempering fluid fills the auxiliary tank 58 and flows through the passage 61 to fill the shallow trough 60, and keep a continuous bubble of water at the top of the tank, in position to be contacted by the soles as they are fed thereover, so that they are thoroughly impregnated with the fluid. The trough portion 60 merges into the side walls of the auxiliary tank at either side in rounded edges, as shown, so that the soles are adapted to slide smoothly thereover. A block of felt or like absorbent material 62 is secured at the side of the auxiliary tank from which the soles are delivered, the top of this felt piece extending slightly above the top of the auxiliary tank. This felt piece or block is held spaced away from the adjacent wall of the main tank 59 by a spacing plate 63, of U-form, the sides of this plate extending down to the bottom of the main tank and coöperating to hold the parts in operative position. This spacing plate is held away from the wall of the main tank, so as to provide a water passage by adjusting screws 64 threaded therethrough and engaging the main tank wall. The auxiliary tank 58 is shown as held in the main tank or receptacle by screw bolts 65 and may be readily taken out as required by removing these screw bolts.

In operation, as a sole approaches the tempering station, it contacts with the roller 34 and presses the same upward against the spring 37, thus, through the rods 40, lever 42, link 44, lever 48, and link 51, operating the valve 53 to admit the tempering fluid to the tank. The fluid thereupon flows through the passage 61 and makes a bubble over the shallow trough 60 during the interval that the sole is passing thereover, the valve being operated to instantly shut off the flow of fluid as soon as the sole has completely passed under the roller 34, and thus been exposed over its entire surface to the bubble projected up from the trough 60. It is to be observed that the surface of the sole, as it passes over the trough 60, is thus treated to all the fluid that it can absorb, this fluid being even forced into the sole under some little pressure, since the sole substantially closes the top of the trough as it passes thereover; thus the stock is thoroughly impregnated with the tempering fluid, and as it passes along, the felt block 62 fulfils the combined function of further promoting the even spreading of the fluid to every part of the sole, and wipes off any superfluous fluid that may adhere to the sole surface beyond the amount capable of being absorbed thereby. Any excess liquid is caught by the adjacent wall 59 of the outer tank and flows down between it and the spacing plate 63 to the lower portion of the main tank, where it may be drained off in any suitable manner.

My invention thus provides a tempering station formed and arranged to continuously deliver to the sole as it is passed thereover, the maximum quantity of tempering liquid that it is capable of absorbing, by exposing it as it moves to a body of the tempering liquid of some little extent, which is forced into the stock by pressure and moving impulse, as the stock is fed along. Further, the improved construction insures that no more than the proper amount of tempering fluid shall remain on the stock, and provides against any waste of the fluid; this latter point is of importance, both on account of the cost of the tempering liquid, when special liquids are employed, and also on account of the nuisance which would be created should the tempering liquid be allowed to waste around the machine.

It is to be understood that the present embodiment of the invention, while desirable and efficient, is only an illustrative one, and that the invention in certain of its broader aspects is capable of being carried out in other ways, for example, by the form of tempering station shown in my aforesaid prior application, on which, as well as on the showing of the present case, the broader claims are intended to be based.

Having described my invention, what I claim as new and desire to secure by Letters Patent is:

1. An apparatus of the kind described, comprising a conveyer system for leather stock pieces, means for applying tempering fluid to the pieces conveyed thereby, and means coöperative with a subsequent portion of said system for flexing the pieces, said parts being arranged to hold the pieces strongly gripped with even pressure over all parts of the surface thereon as the flexing occurs to complete the tempering operation and render the pieces permanently pliable.

2. An apparatus of the kind described, comprising means for flexing leather stock formed and arranged to strongly and evenly grip and press upon all parts of the stock surface, and coöperative means arranged adjacent the path of the incoming stock to impregnate the same with tempering fluid before the flexing thereof, whereby said flexing completes the tempering operation and renders the leather permanently pliable.

3. An apparatus of the kind described, comprising mechanism for flexing leather stock to render the same flexible, having provision for feeding the stock to the flexing means, and means for evenly applying tempering fluid to the stock as it is fed to the flexing means, the parts being arranged to first impregnate the stock with tempering fluid and then flex the stock to complete the tempering operation and render the stock permanently pliable.

4. In an apparatus of the kind described, means for impregnating with tempering fluid one side only of a leather piece, and leather flexing means to place the same side of the leather piece locally under tension sufficient to open the pores thereof, said two means being coöperatively arranged for conjoint action, one after the other on the leather piece to complete the tempering operation and render the leather permanently pliable.

5. In an apparatus of the kind described, means for impregnating with tempering fluid one side only of the leather piece, and leather flexing means arranged for conjoint operation therewith, for immediately thereafter placing the same side of the leather piece locally under tension sufficient to open the pores thereof for completing the tempering operation and rendering the leather permanently pliable, said flexing means being formed to press strongly and evenly upon all parts of the surface of the leather piece.

6. In an apparatus of the kind described, means for impregnating with tempering fluid one side only of the leather piece, and flexing means arranged for coöperation therewith to locally stretch the moistened surface of the leather piece sufficiently to open the pores thereof by bending the same so as to place the tempered surface under tension as the piece passes through the machine, said means being arranged to press strongly and evenly upon all parts of the tempered surface as it is flexed.

7. In an apparatus of the kind described, means for impregnating with tempering fluid one side of the leather piece, and flexing means arranged for coöperation therewith to locally stretch the moistened surface of the leather piece sufficiently to open the pores thereof by bending the same to place the moistened surface under tension, and thereafter relieve the said tension and restore the surface to normal plane condition as it passes through the machine.

8. An apparatus of the kind described, comprising a conveyer system adapted to engage and feed articles of the kind described arranged to expose one side of the soles in a part of their travel, means for evenly applying tempering fluid to the side of the sole so exposed, and means coöperative with a subsequent portion of the conveyer system for flexing the soles about a curve of relatively small radius in a manner to stretch the same side of the soles, whereby the tempering operation is completed and the soles rendered permanently pliable.

9. An apparatus of the kind described, comprising an endless belt conveyer system arranged to provide a receiving throat to engage and advance articles of the kind described and with provision to press strongly and evenly upon all parts of the surface of the soles conveyed thereby, means for applying tempering fluid to a side of the soles as they are moved along, and means coöperative with a subsequent portion of said conveyer system for flexing the soles about an arc of small radius while held strongly and evenly pressed between the belts of said conveyer system for the purpose stated.

10. An apparatus of the kind described, comprising an endless belt conveyer system arranged to provide a receiving throat to engage and advance articles of the kind described having provision to grip and press strongly upon all parts of the surface of soles conveyed thereby, means for applying tempering fluid to a side of the soles as they are moved along, and means coöperative with the subsequent portion of said conveyer system for flexing the soles about arcs of small radii in reversed directions for the purpose stated.

11. An apparatus of the kind described, comprising a station adapted to supply tempering fluid evenly to pieces of stock, means for feeding the stock pieces to and past said station, a pair of belts in position to receive the stock pieces after passing said tempering station, said belts having provision to be held strongly taut and to press firmly upon all parts of the stock surface, and means coöperative with said belts for flexing pieces of stock clamped between the same about an arc of relative small radius to complete the tempering operation and render the stock permanently pliable.

12. An apparatus of the kind described, comprising means for flexing leather stock to open the pores thereof having provision for feeding the articles thereto, and means adjacent the line of feed for applying tempering fluid to the stock, said means consisting in a fluid applying station having provision for automatically supplying a definite quantity of tempering fluid as the stock piece is moved thereto, and for stopping the supply of tempering fluid as the stock piece moves therefrom, said flexing means being coöperative with said fluid applying means to complete the tempering of the stock and render the same permanently pliable.

13. An apparatus of the kind described, comprising means for flexing leather stock to open the pores thereof having a definite line of feed for articles to be supplied thereto, and a fluid applying station adjacent the line of feed, having a supply connection for tempering fluid automatically controllable by the passage of the articles past the fluid applying station, said station having provision for applying definite quantities of fluid evenly over the stock surface and coöperating with said flexing means to complete the tempering operation and render the stock permanently flexible.

14. An apparatus of the kind described, comprising means for flexing leather stock to open the pores thereof at one side and render the same pliable, and means for applying tempering fluid to that side of the stock only which is opened and stretched, said means consisting in a fluid applying station having a supply of tempering fluid arranged to be automatically controlled by the passage of the piece of stock past the same, said flexing and fluid applying means being coöperative to complete the tempering operation and render the stock permanently flexible.

15. An apparatus of the kind described, comprising means for flexing leather stock having provision for feeding articles in a line thereof, and a fluid applying station arranged adjacent the line of feed, having connections for supplying tempering fluid under pressure, said connections being automatically operable by engagement with the stock pieces as they are moved past the fluid applying station to supply tempering fluid in determinate quantity and to then close said supply, said fluid applying station and said flexing means being arranged for coöperation to complete the tempering operation and to render the stock permanently pliable.

16. An apparatus of the kind described, comprising means for flexing leather stock, said means having provision for receiving stock pieces in a continuous definite line of feed, a fluid applying station arranged adjacent said line of feed, and means for automatically controlling the supply of tempering fluid thereto, comprising a presser foot yieldingly mounted for engagement by a stock piece as it approaches the fluid applying station, said presser foot having connections for operating a valve controller for the tempering fluid to supply the same in determinate quantity to each stock piece, said fluid applying station and said flexing means being arranged for coöperation to complete the tempering operation and to render the stock permanently pliable.

In testimony whereof, I have signed my name to this specification, in the presence of two subscribing witnesses.

GEORGE BASLER.

Witnesses:
 WALLACE C. WRIGHT,
 C. L. ROGERS.